(12) United States Patent
Tanaya

(10) Patent No.: US 7,789,595 B2
(45) Date of Patent: Sep. 7, 2010

(54) COMBUSTION STATE DETECTION APPARATUS FOR INTERNAL COMBUSTION ENGINE

(75) Inventor: Kimihiko Tanaya, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/430,528

(22) Filed: Apr. 27, 2009

(65) Prior Publication Data

US 2010/0122689 A1     May 20, 2010

(30) Foreign Application Priority Data

Nov. 20, 2008    (JP)  ............... 2008-296621

(51) Int. Cl.
*F02P 5/00*     (2006.01)
*F02P 3/08*     (2006.01)

(52) U.S. Cl. .................. 406/13; 123/605; 123/618; 123/644

(58) Field of Classification Search ............ 123/406.13, 123/601, 605, 618, 621, 644
See application file for complete search history.

(56) References Cited

U.S. PATENT DOCUMENTS 7,062,373 B2 *   6/2006   Takahashi et al. ........... 701/114
7,467,626 B2 *   12/2008   Naruse et al. ............... 123/605
7,581,534 B2 *   9/2009   Aida et al. .................. 123/644
7,673,614 B2 *   3/2010   Inada et al. ............ 123/406.26
2007/0137628 A1 *   6/2007   Naruse et al. ............... 123/618

FOREIGN PATENT DOCUMENTS

JP     2006-046140 A     2/2006

* cited by examiner

*Primary Examiner*—Hai H Huynh
(74) *Attorney, Agent, or Firm*—Sugrue Mion, PLLC

(57) ABSTRACT

Disclosed is a combustion state detection apparatus for an internal combustion engine, which is capable of detecting abnormal combustion with high accuracy. The combustion state detection apparatus for an internal combustion engine includes: a variety of sensors; an ignition coil; an ignition plug; a transistor; a switching control unit; an ion current detection unit; and abnormal combustion detection units for determining that abnormal combustion has occurred in a case where a crank angle at a point of time when the ion current exceeds a predetermined current value or when the ion current that exceeds the predetermined current value reaches a peak value thereof is on a spark-advance side compared with a crank angle for determining abnormal combustion. The switching control unit ends the spark discharge at a predetermined timing while the spark discharge is in progress after the primary current is shut off and the spark discharge is generated.

9 Claims, 4 Drawing Sheets

COMBUSTION STATE DETECTION APPARATUS FOR INTERNAL COMBUSTION ENGINE

BACKGROUND OF THE INVENTION

1. Field of the Invention

The present invention relates to a combustion state detection apparatus for an internal combustion engine, which detects abnormal combustion that has occurred in a combustion chamber of the internal combustion engine.

2. Description of the Related Art

In recent years, problems regarding environmental preservation, fuel exhaustion, and the like have been raised. For example, in the automotive industry, what measures are to be taken against those problems has been a serious challenge.

As the measures against those problems, a variety of technologies for maximizing engine efficiencies of internal combustion engines have been developed. However, on the contrary, occurrence frequencies of abnormal combustion in combustion chambers have been increased, causing such new problems as damage on internal combustion engines, decrease in durability thereof, and decrease in commercial value thereof.

Thus, in order to solve the above-mentioned problems, it is desired to detect abnormal combustion that has occurred in the combustion chamber, and to suppress the abnormal combustion in the case where the abnormal combustion has been detected.

A conventional combustion state detection apparatus for an internal combustion engine estimates a combustion pressure based on a detected ion current, determines that abnormal combustion has occurred in a combustion chamber in a case where a timing when the maximum value of the combustion pressure is obtained is on a spark-advance side compared with a predetermined reference timing, and executes abnormal combustion suppression processing such as increasing of an amount of fuel and delaying of an ignition timing (for example, refer to JP 2006-46140 A).

However, a problem described below has been inherent in the prior art.

In the conventional combustion state detection apparatus for an internal combustion engine, the combustion pressure of the internal combustion engine is estimated based on the ion current. However, in many cases, in an actual internal combustion engine, the maximum value of the combustion pressure generated as a result of the abnormal combustion is distributed immediately before ignition and immediately after ignition.

Here, immediately after ignition, a spark discharge for firing an air-fuel mixture in the combustion chamber is in progress, and a negative voltage is applied to an ignition plug. Accordingly, the ion current cannot be detected, and the combustion pressure cannot be estimated.

Therefore, the ion current cannot be detected with high accuracy during a period including before and after the ignition, resulting in such a problem that the abnormal combustion that has occurred in the combustion chamber cannot be detected with high accuracy.

SUMMARY OF THE INVENTION

The present invention has been made in order to solve the problem described above. It is an object of the present invention to obtain a combustion state detection apparatus for an internal combustion engine, which is capable of detecting, with high accuracy, abnormal combustion that has occurred in a combustion chamber.

According to the present invention, a combustion state detection apparatus for an internal combustion engine includes: operation state detection means for detecting an operation state of the internal combustion engine; an ignition coil that has a primary winding and a secondary winding, and generates a high voltage in the secondary winding when a primary current flowing through the primary winding is shut off; an ignition plug that is connected to the secondary winding, and generates a spark discharge for firing an air-fuel mixture in a combustion chamber of the internal combustion engine when the high voltage generated in the secondary winding is applied to the ignition plug; a switching element that is connected to the primary winding, and conducts and shuts off the primary current; switching control means for creating an ignition signal that switches between conduction and shutoff of the primary current based on the operation state, and for controlling driving of the switching element in accordance with the ignition signal; ion current detection means for detecting, as an ion current, ions generated in combustion of the air-fuel mixture by the spark discharge; and abnormal combustion detection means for determining that abnormal combustion has occurred in the combustion chamber in a case where one of a crank angle of a crankshaft at a point of time when the ion current exceeds a predetermined current value and a crank angle at a point of time when the ion current that exceeds the predetermined current value reaches a peak value thereof is on a spark-advance side compared with a crank angle for determining abnormality, in which the switching control means ends the spark discharge at a predetermined timing while the spark discharge is in progress after the primary current is shut off and the spark discharge is generated.

According to the combustion state detection apparatus for an internal combustion engine of the present invention, the spark discharge is ended at the predetermined timing while the spark discharge is in progress after the primary current is shut off and the spark discharge is generated from the ignition plug. In such a way, a period during which a negative voltage is applied to the ignition plug is shortened, whereby a period during which the ion current cannot be detected can be shortened.

Therefore, the abnormal combustion that has occurred in the combustion chamber can be detected with high accuracy.

DETAILED DESCRIPTION OF THE PREFERRED EMBODIMENTS

Hereinbelow, a description is made of an embodiment of the present invention with reference to the drawings, and the same or equivalent portions in the respective drawings are denoted by the same reference symbols.

Note that, though the description is made by taking as an example a case where a combustion state detection apparatus for an internal combustion engine is mounted on an automobile, the present invention is not limited thereto, and the combustion state detection apparatus may be mounted on a motorcycle, an outboard motor, other special machines, and the like, which use the internal combustion engine.

Embodiment 1

Figure 1:
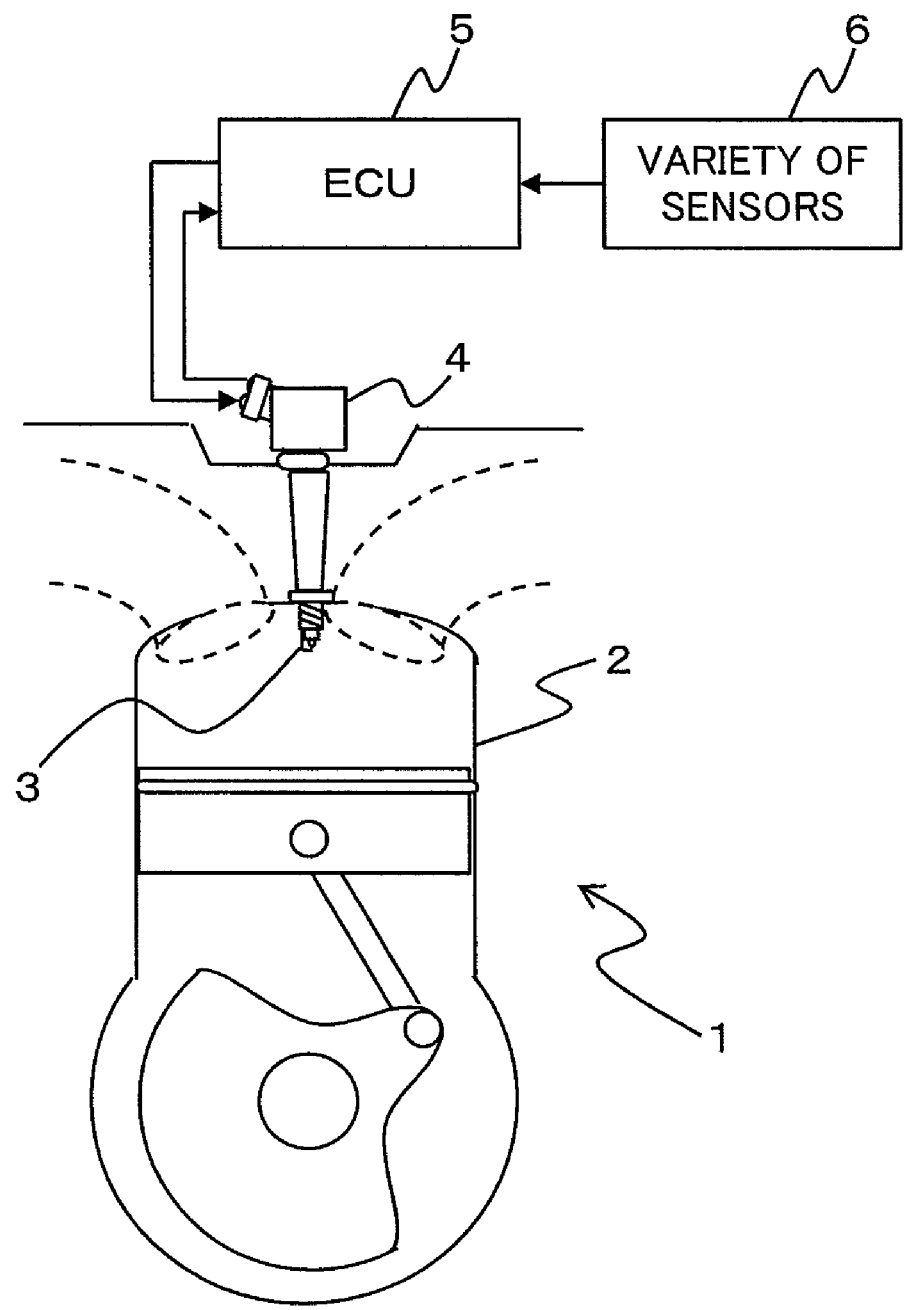
FIG. 1 is a configuration diagram illustrating a combustion state detection apparatus for an internal combustion engine according to Embodiment 1 of the present invention.

FIG. 1 is a configuration diagram illustrating a combustion state detection apparatus for an internal combustion engine according to Embodiment 1 of the present invention.

In FIG. 1, an ignition plug 3 is provided on a top portion of a cylinder 2 of an internal combustion engine 1. The ignition plug 3 generates a spark discharge for firing an air-fuel mixture in a combustion chamber of the internal combustion engine 1. Further, the ignition plug 3 also has a function as a detection probe that detects an ion current.

Further, an ignition coil device 4 is connected to the ignition plug 3. The ignition coil device 4 applies, to the ignition plug 3, a high voltage for generating the spark discharge. Further, the ignition coil device 4 also has functions to apply, to the ignition plug 3, a voltage for detecting the ion current, and to output a detected ion current signal (described later).

Further, an engine control unit 5 (hereinafter, referred to as an "ECU 5") is connected to the ignition coil device 4, and a variety of sensors 6 (operation state detection means) are connected to the ECU 5.

The variety of sensors 6 detect an operation state (rpm, load, and the like) of the internal combustion engine 1.

Based on the ion current signal from the ignition coil device 4 and on the operation state from the variety of sensors 6, the ECU 5 detects a combustion state of the internal combustion engine 1, and controls an operation of the internal combustion engine 1.

Figure 2:
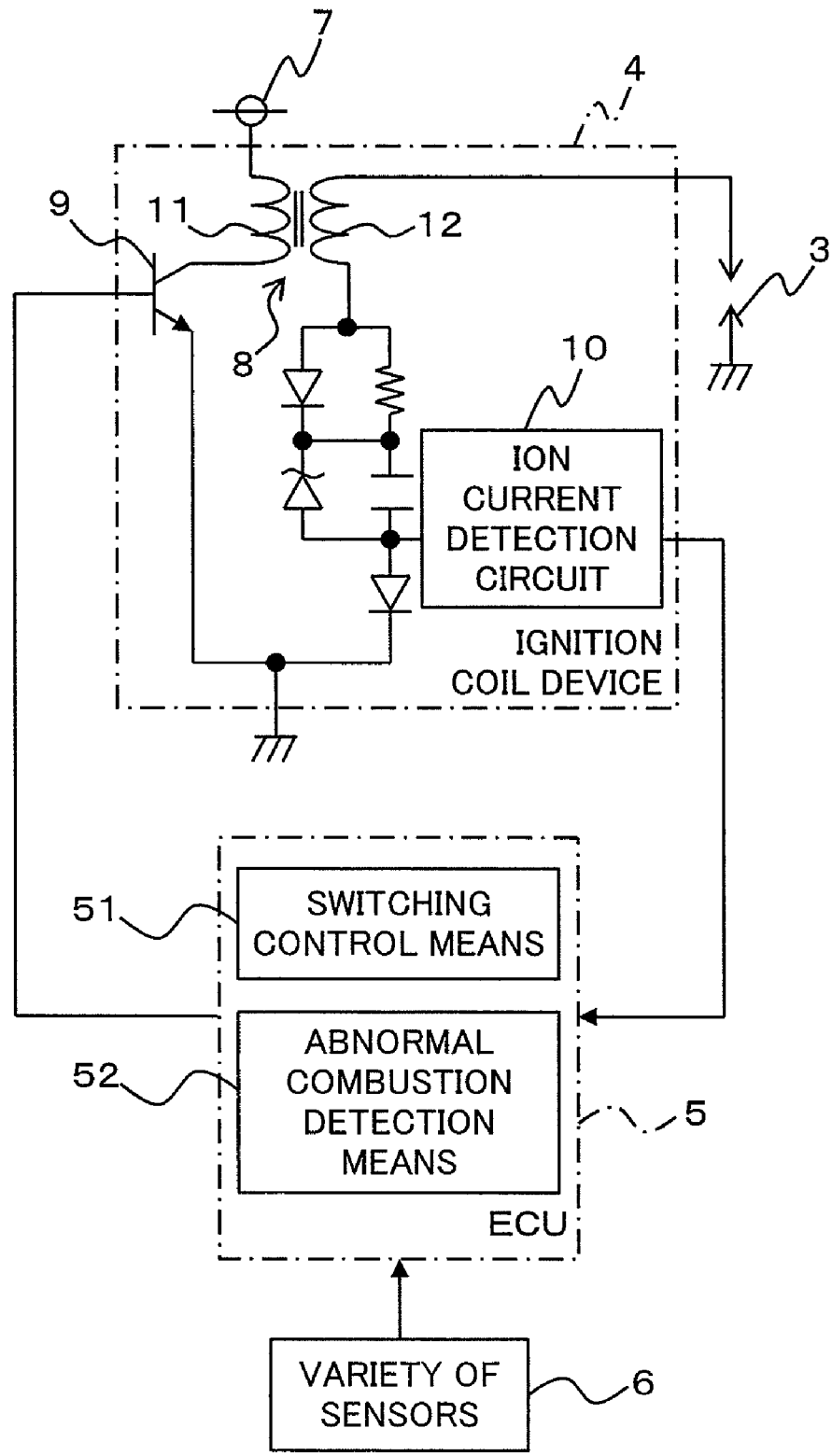
FIG. 2 is a circuitry diagram illustrating an ignition coil together with peripheral devices thereof according to Embodiment 1 of the present invention.

FIG. 2 is a circuitry diagram illustrating the ignition coil device 4 together with peripheral devices thereof according to Embodiment 1 of the present invention.

In FIG. 2, the ignition plug 3, a battery 7, and the ECU 5 are connected to the ignition coil device 4. Further, the ignition coil device 4 is connected to the ground.

The ignition coil device 4 includes an ignition coil 8, a transistor 9 (switching means), and an ion current detection circuit 10 (ion current detection means).

The ignition coil 8 has a primary winding 11 and a secondary winding 12. One end of the primary winding 11 is connected to the battery 7. Further, the other end of the primary winding 11 is connected to the ground through the transistor 9. One end of the secondary winding 12 is connected to the ignition plug 3. Further, the other end of the secondary winding 12 is connected to the ground through a circuit element unit including a diode, a resistor, a Zener diode, and a capacitor. Further, the primary winding 11 and the secondary winding 12 are magnetically coupled to each other, and form a transformer.

The transistor 9 conducts and shuts off a primary current flowing through the primary winding 11 in accordance with an ignition signal (described later) from the ECU 5.

Here, when the primary current flowing through the primary winding 11 is shut off, then, owing to a self-induction function of the primary winding 11, a positive voltage is generated on the transistor 9 side of the primary winding 11, and a negative voltage is generated on the battery 7 side of the primary winding 11.

Further, at this time, owing to a mutual induction function between the primary winding 11 and the secondary winding 12, a secondary voltage that is high and has a polarity corresponding to that of the primary winding 11 is generated in the secondary winding 12. Specifically, a high positive voltage is generated on the ground side of the secondary winding 12, and a high negative voltage is generated on the ignition plug 3 side of the secondary winding 12. The spark discharge is generated from the ignition plug 3 by such a voltage applied thereto. The spark discharge continues for a while from the start thereof.

Note that, when conduction of the primary current is started, a voltage reverse in polarity to that when the primary current is shut off is generated in both the primary winding 11 and the secondary winding 12.

The ion current detection circuit 10 detects, as the ion current, ions generated by combustion of the air-fuel mixture by the spark discharge. Further, the ion detection circuit 10 outputs the detected ion current as the ion current signal to the ECU 5. Note that the ion current detection circuit 10 cannot detect the ion current while the spark discharge is in progress, that is, in the case where the negative voltage is applied to the ignition plug 3.

The ECU 5 includes switching control means 51 and abnormal combustion detection means 52.

Here, the ECU 5 is configured of a microprocessor (not shown) having a CPU and a storage unit storing a program.

Based on the operation state from the variety of sensors 6, the switching control means 51 performs arithmetic operation for an ignition timing and the like, and creates the ignition signal. Then, the switching control means 51 controls ON/OFF driving of the transistor 9 in accordance with the ignition signal.

Further, after shutting off the primary current flowing through the primary winding 11 and generating the spark discharge, the switching control means 51 starts reconduction of the primary current at a predetermined timing while the spark discharge is in progress, and thereby ends the spark discharge. Here, the predetermined timing is when a predetermined period of time has elapsed after the spark discharge is generated.

Note that, as another method of ending the spark discharge, after the spark discharge is generated, the secondary side of the ignition coil device 4 may be grounded at the predetermined timing while the spark discharge is in progress.

Based on the ion current signal from the ignition coil device 4, the abnormal combustion detection means 52 determines that the abnormal combustion has occurred in the combustion chamber in the case where a crank angle of a crankshaft (not shown) at the point of time when the ion current exceeds a predetermined current value or a crank angle at the point of time when the ion current that exceeds the predetermined current value reaches a peak value thereof is on a spark-advance side compared with a crank angle for determining abnormality.

Further, in the case of having determined that the abnormal combustion has occurred, the abnormal combustion detection means 52 executes, with respect to the internal combustion, abnormal combustion suppression processing such as increasing of an amount of fuel in the air-fuel mixture and delaying of the ignition timing.

Further, the abnormal combustion detection means 52 sets the predetermined current value to be compared with the ion current in accordance with a change of the secondary voltage applied to the secondary winding 12. Specifically, in the case where the secondary voltage has risen sharply, the predetermined current value is set to also rise sharply in accordance with the secondary voltage. In such a way, erroneous detection is suppressed, whereby the abnormal combustion can be detected with high accuracy.

Note that the crank angle for determining abnormality is a map value to be set, for example, in accordance with the rpm and load of the internal combustion engine 1.

Hereinbelow, a description is made of processing of detecting the abnormal combustion performed in the combustion state detection apparatus for an internal combustion engine according to Embodiment 1 of the present invention while referring to a timing chart of FIG. 3.

Figure 3:
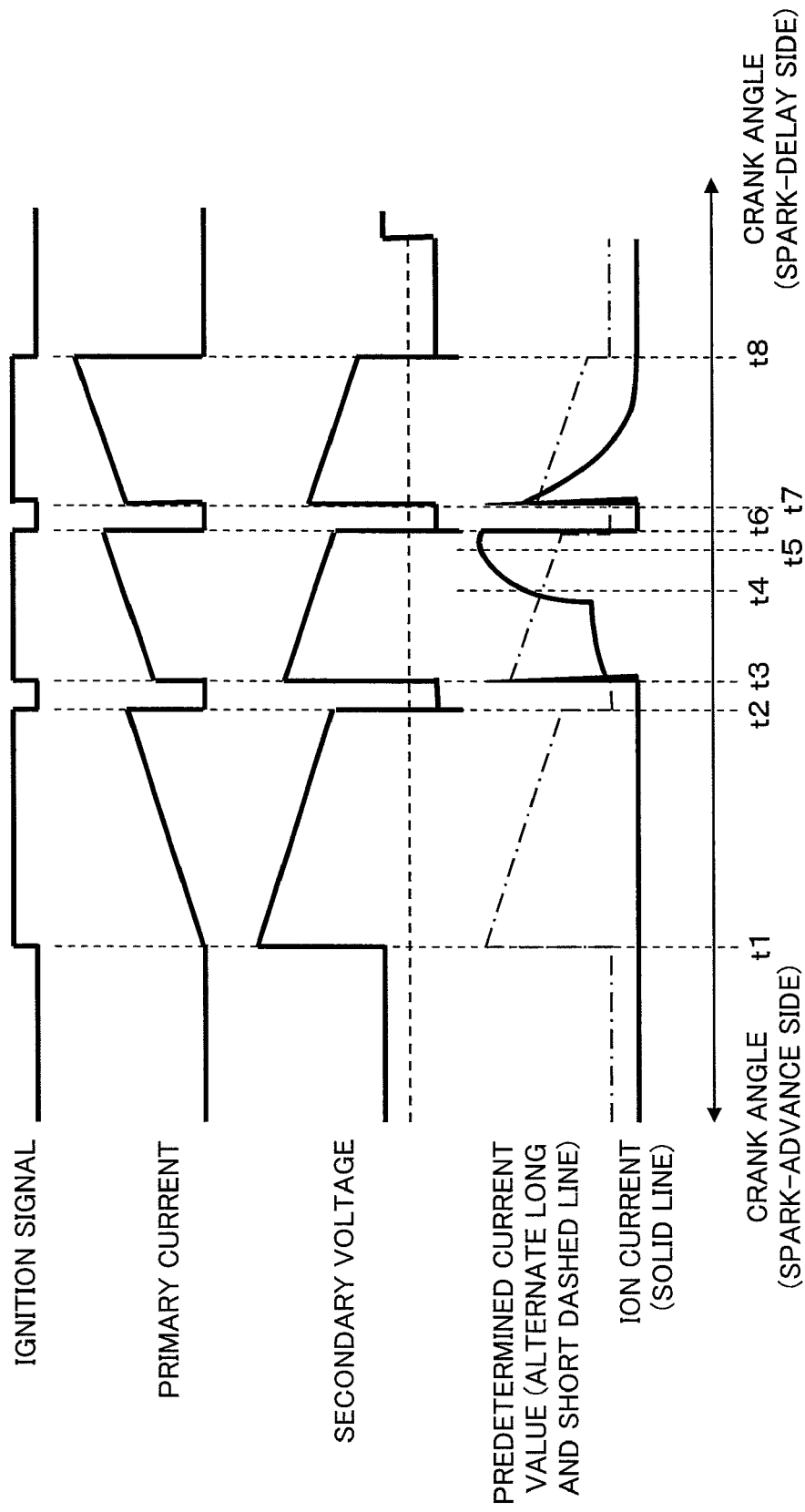
FIG. 3 is a timing chart for describing abnormal combustion detection processing in the combustion state detection apparatus for an internal combustion engine according to Embodiment 1 of the present invention.

In FIG. 3, an axis of abscissas represents the crank angle, a left side of the chart represents the spark-advance side, and a right side of the chart represents a spark-delay side.

First, at a crank angle timing t1 (hereinafter, abbreviated as "timing t1"), the first conduction of the primary current to the primary winding 11 is started. At the timing t1, the secondary voltage to be applied to the secondary winding 12 rises sharply, and accordingly, the predetermined current value is set so as to also rise sharply in accordance with the change of the secondary voltage.

Further, the secondary voltage decreases gradually after the timing t1, and accordingly, the predetermined current value is set so as to also decrease gradually.

Subsequently, at a timing t2, the primary current flowing through the primary winding 11 is shut off. At this time, the secondary voltage having a high value is generated in the secondary winding 12, and the spark discharge is generated from the ignition plug 3. Here, the first spark discharge is a main spark discharge for firing the air-fuel mixture in the combustion chamber. Note that, as described above, the negative voltage is applied to the ignition plug 3 while the spark discharge is in progress, and accordingly, the ion current cannot be detected.

Therefore, the predetermined current value is set in the vicinity of a predetermined reference current value in a similar way to before the timing t1. However, since the ion current should not be detected in this range, it is less significant to actually set the predetermined current value. Accordingly, the predetermined current value may be monotonously decreased as it goes, or the predetermined current value does not have to be set, or in order to avoid the erroneous detection, the predetermined current value may be raised to an extent of upper limit, that is, to an extent to which the erroneous detection can be avoided without fail.

However, it is unknown when the abnormal combustion is to occur. Accordingly, it is desirable to make it possible to detect the ion current even while the spark discharge is in progress.

Accordingly, at a timing t3 when the spark discharge is in progress, which is when a predetermined period of time has elapsed from the timing t2 of shutting off the primary current, the switching control means 51 forcibly ends the spark discharge, and starts the second conduction (reconduction) of the primary current to the primary winding 11.

Note that, for example, in an idling state or an operation state with a small load, a sufficient duration of the spark discharge is necessary. If the spark discharge is forcibly ended in such a state, there arises a fear that original combustibility may be damaged.

Therefore, the switching control means 51 executes the reconduction of the primary current only in the case where the operation state is a state in which the rpm is low and the load is large (predetermined operation state).

Further, as described above, the necessary duration of the spark discharge differs depending on the operation state. Therefore, in accordance with the operation state, the switching control means 51 sets the predetermined period of time from the timing t2 when the primary current is shut off to the timing t3 when the reconduction of the primary current is started in such a manner that the predetermined period of time becomes shorter, for example, as the rpm becomes higher or the load becomes larger. In such a way, a period during which the negative voltage is applied to the ignition plug 3 is shortened, whereby a period during which the ion current cannot be detected can be shortened.

At the timing t3, the reconduction of the primary current to the primary winding 11 is started, and accordingly, the secondary voltage to be applied to the secondary winding 12 rises sharply. However, since the duration of the spark discharge is short, the secondary voltage at the timing t3 takes a smaller value than the secondary voltage at the timing t1. Accordingly, the predetermined current value at the timing t3 is set at a smaller value than the predetermined current value at the timing t1.

Further, the secondary voltage decreases gradually after the timing t3, and hence the predetermined current value is set so as to also decrease gradually.

Next, it is assumed that the ion current has exceeded the predetermined current value at a timing t4 during the reconduction of the primary current, and that the ion current that has exceeded the predetermined current value reaches the peak value at a timing t5.

The abnormal combustion detection means 52 compares a crank angle at the timing t4 or a crank angle at the timing t5 with the crank angle for determining abnormality. Then, in the case where the crank angle at the timing t4 or the timing t5 is on the spark-advance side compared with the crank angle for determining abnormality, the abnormal combustion detection means 52 determines that the abnormal combustion has occurred in the combustion chamber.

Here, in the vicinity of the timing of the conduction or shutoff of the primary current, it is highly possible that noise may occur. Therefore, during a predetermined period in the vicinity of such timing, the abnormal combustion detection means 52 executes such processing that ignores the fact that the ion current has exceeded the predetermined current value even if the fact occurs.

Note that, in order to enhance detection accuracy for the ion current, it is necessary that a sufficient secondary voltage be applied to the ignition plug 3. In Embodiment 1 of the present invention, for example, approximately 400 V is assumed as the secondary voltage necessary to ensure the detection accuracy for the ion current. In the case where the secondary voltage is not sufficient, a range where the ion current can be detected becomes only the vicinity of the electrodes of the ignition plug 3, and the detection accuracy for the ion current is decreased.

Accordingly, the switching control means 51 repeats the reconduction of the primary current a plurality of times so that the secondary voltage to be applied to the secondary winding 12 does not fall down below 400 V (predetermined voltage). In such a way, the sufficient secondary voltage can be applied to the ignition plug 3.

Therefore, the switching control means 51 shuts off the primary current flowing through the primary winding 11 at a timing t6 before the secondary voltage that decreases gradually after the timing t3 falls below 400 V.

At this time, in a similar way to the case of the timing t2, the secondary voltage having a high value is generated in the secondary winding 12, and the spark discharge is generated from the ignition plug 3. Further, the ion current cannot be detected while the spark discharge is in progress, and accordingly, the predetermined current value is set in the vicinity of the predetermined reference current value in a similar way to the case of the timing t2.

Subsequently, at a timing t7 when the spark discharge is in progress, which is when a predetermined period of time has elapsed from the timing t6 of shutting off the primary current, the switching control means 51 forcibly ends the spark discharge, and starts the third conduction (reconduction) of the primary current to the primary winding 11.

Subsequently, the predetermined current value is set in the same way as the above-mentioned method.

Here, if an ignition operation in which the duration of the spark discharge is short is repeated, then as illustrated in FIG. 3, the primary current increases gradually. For the primary current, a limiting value is set in order to protect the ignition coil 8, and the primary current finally becomes constant at this limiting value. Note that, since electromagnetic induction is no longer generated when the primary current becomes constant, the detection accuracy for the ion current is decreased.

Accordingly, the switching control means 51 does not set the limiting value of the primary current, or sets the limiting value of the primary current at approximately the maximum allowable current value of the primary winding 11. Further, in the case of setting the limiting value of the primary current, the switching control means 51 sets a conduction time and discharge time of the primary current so that the primary current cannot reach the limiting value. In Embodiment 1 of the present invention, for example, approximately 14 A is assumed as the limiting value of the primary current.

Hereinbelow, a description is made of detection processing for the abnormal combustion by the abnormal combustion detection means 52 according to Embodiment 1 of the present invention while referring to a flowchart of FIG. 4.

First, the abnormal combustion detection means 52 compares the crank angle at the point of time when the ion current exceeds the predetermined current value and the crank angle for determining abnormality with each other, and determines whether or not the crank angle at the point of time when the ion current exceeds the predetermined current value is on the spark-advance side compared with the crank angle for determining abnormality (Step S1).

Note that, at this time, a crank angle at the point of time when the ion current that exceeds the predetermined current value reaches the peak value and the crank angle for determining abnormality may be compared with each other.

Figure 4:
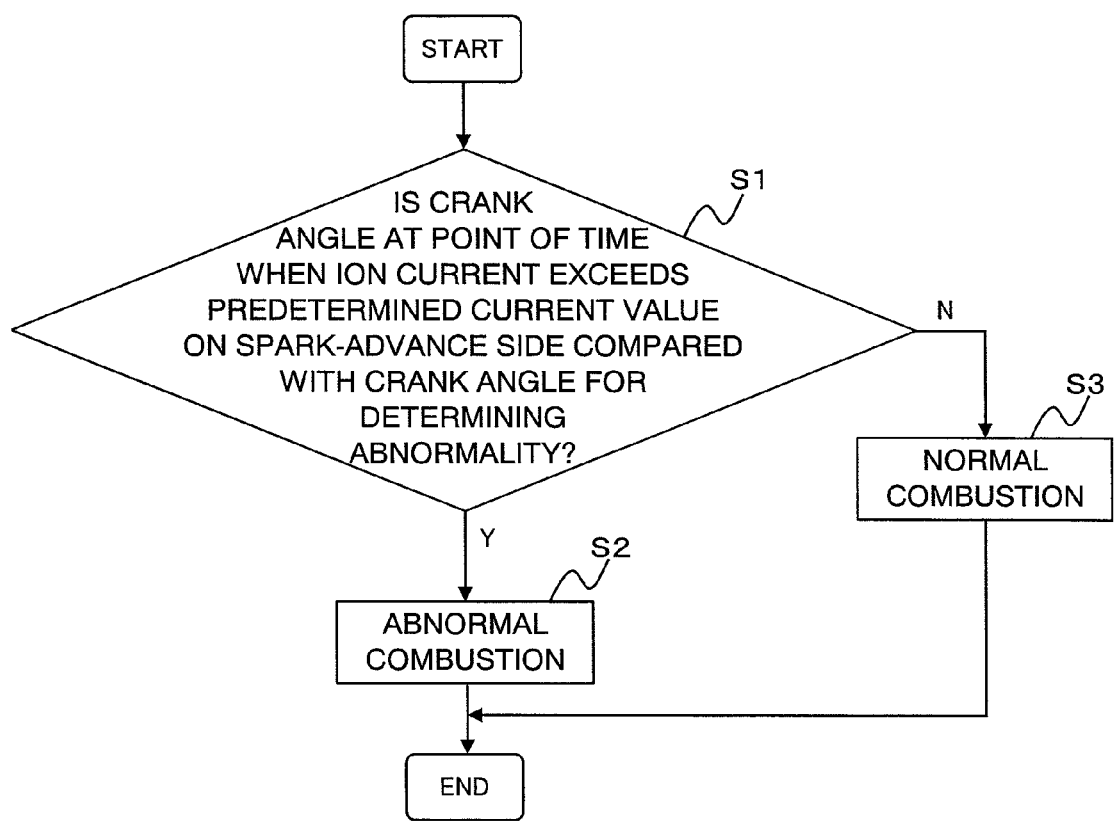
FIG. 4 is a flowchart illustrating the abnormal combustion detection processing by abnormal combustion detection means according to Embodiment 1 of the present invention.

In the case where it is determined in Step S1 that the crank angle at the point of time when the ion current exceeds the predetermined current value is on the spark-advance side (that is, Yes), the abnormal combustion detection means 52 determines that the abnormal combustion has occurred in the combustion chamber (Step S2), and ends the processing of FIG. 4.

Meanwhile, in the case where it is determined in Step S1 that the crank angle at the point of time when the ion current exceeds the predetermined current value is not on the spark-advance side (that is, No), the abnormal combustion detection means 52 determines that the combustion state is normal combustion (Step S3), and ends the processing of FIG. 4.

According to the combustion state detection apparatus for an internal combustion engine of Embodiment 1 of the present invention, when the spark discharge is in progress after the elapse of the predetermined period of time after the primary current is shut off and the spark discharge is generated from the ignition plug, the switching control means starts the reconduction of the primary current, and ends the spark discharge. In such a way, the period during which the negative voltage is applied to the ignition plug is shortened, whereby the period during which the ion current cannot be detected can be shortened.

Therefore, the abnormal combustion that has occurred in the combustion chamber can be detected with high accuracy. Further, by detecting the abnormal combustion with high accuracy, the engine efficiency of the internal combustion engine can be maximized, and the combustion state detection apparatus for an internal combustion engine according to Embodiment 1 of the present invention can be put to work on the problems regarding environmental preservation, fuel exhaustion, and the like.

Note that, in Embodiment 1 described above, it has been described that the switching control means 51 starts the reconduction of the primary current after the predetermined period of time has elapsed after the primary current flowing through the primary winding 11 is shut off and the spark discharge is generated. However, the crank angle at which the abnormal combustion occurs is generally determined depending on the operation state of the internal combustion engine 1.

Accordingly, at a predetermined timing at which the spark discharge is in progress and the crank angle has become a predetermined crank angle set in accordance with the operation state after the primary current is shut off and the spark discharge is generated, the switching control means 51 starts the reconduction of the primary current.

For example, in the case where the operation state is a state where the rpm is higher, the predetermined crank angle is set on the spark-delay side. In the case where the operation state is a state where the rpm is lower, the predetermined crank angle is set on the spark-advance side. In the case where it is determined that an octane number of the fuel is high, the predetermined crank angle is set on the spark-advance side.

Here, in the case where the crank angle timing at which the main spark discharge is generated is on the spark-delay side, there is a fear that the reconduction of the primary current cannot be started at a desired timing. In such a case, the conduction and the shutoff are switched to set the timing of the reconduction in accordance with the ignition timing or switched so that the period of the main spark discharge can be shortened as much as possible in the operation state where the ignition timing is known to be on the spark-delay side. In such a way, the abnormal combustion can be detected with higher accuracy.

What is claimed is:

1. A combustion state detection apparatus for an internal combustion engine, comprising:
    operation state detection means for detecting an operation state of the internal combustion engine;
    an ignition coil that has a primary winding and a secondary winding, and generates a high voltage in the secondary winding when a primary current flowing through the primary winding is shut off;
    an ignition plug that is connected to the secondary winding, and generates a spark discharge for firing an air-fuel mixture in a combustion chamber of the internal combustion engine when the high voltage generated in the secondary winding is applied to the ignition plug;

a switching element that is connected to the primary winding, and conducts and shuts off the primary current;

switching control means for creating an ignition signal that switches between conduction and shutoff of the primary current based on the operation state, and for controlling driving of the switching element in accordance with the ignition signal;

ion current detection means for detecting, as an ion current, ions generated in combustion of the air-fuel mixture by the spark discharge; and abnormal combustion detection means for determining that abnormal combustion has occurred in the combustion chamber in a case where one of a crank angle of a crankshaft at a point of time when the ion current exceeds a predetermined current value and a crank angle at a point of time when the ion current that exceeds the predetermined current value reaches a peak value thereof is on a spark-advance side compared with a crank angle for determining abnormality, wherein the switching control means ends the spark discharge at a predetermined timing while the spark discharge is in progress after the primary current is shut off and the spark discharge is generated.

2. A combustion state detection apparatus for an internal combustion engine according to claim 1, wherein the switching control means starts reconduction of the primary current, to thereby end the spark discharge.

3. A combustion state detection apparatus for an internal combustion engine according to claim 1, wherein the switching control means starts the reconduction of the primary current at a time, as the predetermined timing, when a predetermined period of time has elapsed after the spark discharge is generated.

4. A combustion state detection apparatus for an internal combustion engine according to claim 3, wherein the switching control means sets the predetermined period of time in accordance with the operation state.

5. A combustion state detection apparatus for an internal combustion engine according to claim 1, wherein the switching control means starts the reconduction of the primary current at a time, as the predetermined timing, when the crank angle has become a predetermined crank angle set in accordance with the operation state after the spark discharge is generated.

6. A combustion state detection apparatus for an internal combustion engine according to claim 1, wherein the abnormal combustion detection means variably sets the predetermined current value in accordance with a change of a secondary voltage to be applied to the secondary winding, and detects the abnormal combustion based on the variably set predetermined current value.

7. A combustion state detection apparatus for an internal combustion engine according to claim 1, wherein the switching control means repeats the reconduction of the primary current a plurality of times so that the secondary voltage to be applied to the secondary winding does not fall below a predetermined voltage.

8. A combustion state detection apparatus for an internal combustion engine according to claim 1, wherein the switching control means performs one of setting no limiting value of the primary current and setting the limiting value of the primary current at approximately a maximum allowable current value of the primary winding.

9. A combustion state detection apparatus for an internal combustion engine according to claim 1, wherein:

the operation state includes at least one of an rpm of the internal combustion engine and a load imposed on to the internal combustion engine; and the switching control means executes the reconduction of the primary current in a case where the operation state is a predetermined operation state.

* * * * *